United States Patent
Ito (10) Patent No.: US 8,414,194 B2
(45) Date of Patent: Apr. 9, 2013

(54) CYLINDRICAL ROLLER BEARING

(75) Inventor: Hideji Ito, Kuwana (JP)

(73) Assignee: NTN Corporation, Osaka (JP)

( * ) Notice: Subject to any disclaimer, the term of this patent is extended or adjusted under 35 U.S.C. 154(b) by 0 days.

(21) Appl. No.: 12/737,222

(22) PCT Filed: Jun. 17, 2009

(86) PCT No.: PCT/JP2009/002750
§ 371 (c)(1),
(2), (4) Date: Dec. 20, 2010

(87) PCT Pub. No.: WO2009/157155
PCT Pub. Date: Dec. 30, 2009

(65) Prior Publication Data
US 2011/0091145 A1    Apr. 21, 2011

(30) Foreign Application Priority Data
Jun. 24, 2008 (JP) .................. 2008-163939

(51) Int. Cl.
*F16C 33/34* (2006.01)
*F16C 33/58* (2006.01)

(52) U.S. Cl.
USPC ............ 384/565; 384/450; 384/597; 384/618

(58) Field of Classification Search .................. 384/450, 384/564–566, 569, 571, 597, 622, 548, 618
See application file for complete search history.

(56) References Cited

U.S. PATENT DOCUMENTS

| | | | | |
|---|---|---|---|---|
| 4,318,574 | A * | 3/1982 | Nakamura | 384/564 |
| 6,702,471 | B2 * | 3/2004 | Sakoda et al. | 384/450 |
| 6,767,134 | B2 | 7/2004 | Murai et al. | |
| 6,997,616 | B2 * | 2/2006 | Sakoda et al. | 384/450 |
| 6,997,617 | B2 * | 2/2006 | Ide et al. | 384/450 |
| 7,048,445 | B2 * | 5/2006 | Torisawa | 384/450 |
| 7,416,346 | B2 * | 8/2008 | Takemura et al. | 384/568 |
| 2003/0012477 | A1 | 1/2003 | Murai et al. | |

(Continued)

FOREIGN PATENT DOCUMENTS

| | | |
|---|---|---|
| CN | 1302962 | 7/2001 |
| CN | 1396392 | 2/2003 |

(Continued)

OTHER PUBLICATIONS

International Search Report for PCT/JP2009/002750, mailed Aug. 11, 2009.

(Continued)

*Primary Examiner* — Marcus Charles (57) ABSTRACT

A cylindrical roller bearing assembly capable of increasing the load bearing capability with respect to the thrust load and of easily controlling the shape of the cylindrical roller is provided. The cylindrical roller bearing assembly includes an inner ring, an outer ring and a plurality of cylindrical rollers. One or both of the inner and outer rings has/have a collar. A surface portion encompassed within the region of radial dimensions of 0.12 Da to 0.20 Da as measured from an outer diametric edge of an end face of each of the cylindrical rollers to a roller axis, wherein Da represents an outer diameter of each of the cylindrical rollers is rendered to be a crowned portion of a tapered shape inclined at an angle $\theta r$ of 0.25 to 1° relative to a plane perpendicular to the roller axis.

9 Claims, 5 Drawing Sheets

U.S. PATENT DOCUMENTS

2004/0240764 A1 12/2004 Ide et al.
2005/0058381 A1* 3/2005 Kiyo ............................ 384/565
2009/0324155 A1 12/2009 Okamoto et al.

FOREIGN PATENT DOCUMENTS

| CN | 1573145 | | 2/2005 |
|---|---|---|---|
| CN | 2918853 | | 7/2007 |
| GB | 1374098 | | 11/1974 |
| JP | 47-11861 | | 6/1972 |
| JP | 57-114026 | | 7/1982 |
| JP | 58-22515 | | 2/1983 |
| JP | 59-106719 | | 6/1984 |
| JP | 2000-304038 | | 10/2000 |
| JP | 2002-89548 | | 3/2002 |
| JP | 2002-195272 | | 7/2002 |
| JP | 2002310160 A * | | 10/2002 |
| JP | 2003-254328 | | 9/2003 |
| JP | 2004-353744 | | 12/2004 |
| JP | 2005-69276 | | 3/2005 |
| JP | 2005069276 A * | | 3/2005 |
| JP | 2005-155763 | | 6/2005 |
| JP | 2006-112559 | | 4/2006 |
| JP | 2006-112568 | | 4/2006 |
| JP | 2006194320 A * | | 7/2006 |

OTHER PUBLICATIONS

English Translation of the International Preliminary Report on Patentability mailed Feb. 17, 2011 in corresponding International Patent Application PCT/JP2009/002750.

Chinese Office Action issued Sep. 5, 2012 in corresponding Chinese Patent Application No. 200980123228.7.

Japanese Office Action issued Nov. 20, 2012 in corresponding Japanese Patent Application No. 2008-163939.

* cited by examiner

CYLINDRICAL ROLLER BEARING

CROSS REFERENCE TO THE RELATED APPLICATION

This application claims the benefit under 35 U.S.C. Section 371, of PCT International Application No. PCT/JP2009/002750, filed Jun. 17, 2009, which claims priority to Japanese patent application No. 2008-163939, filed Jun. 24, 2008, the entire disclosures of which are herein incorporated by reference.

BACKGROUND OF THE INVENTION

1. Field of the Invention

The present invention relates to a cylindrical roller bearing assembly for use in an industrial machinery that requires a high speed rotation and a high thrust load bearing capability.

2. Description of the Related Art

As a method of increasing the load bearing capability of the cylindrical roller bearing assembly to bear the thrust load, various technologies have hitherto been suggested.

For example, in the cylindrical roller bearing assembly disclosed in the Patent Document 1 listed below, in order to suppress an edge load when the thrust load is loaded, a crowned portion of a curved shape having a sectional shape represented by an exponential function is provided in an end face of each of the cylindrical rollers. Also, in the cylindrical roller bearing assembly disclosed in the Patent Document 2 listed below, a similar crowned portion is provided in an end face of each of the cylindrical rollers.

As discussed above, the provision of the crowned portion in the end face of each of the cylindrical rollers, which renders the sectional shape thereof to represent an ideal curved shape is effective to equalize the pressure of contact between a collar face and each of the cylindrical rollers, when the thrust load is loaded, within a contact region.

[Patent Document 1] JP Laid-open Patent Publication No. 2004-353744
[Patent Document 2] JP Laid-open Patent Publication No. 2002-195272

SUMMARY OF THE INVENTION

Figure 9A:
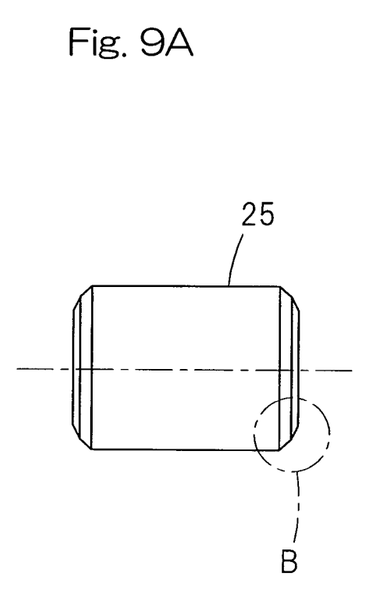
FIG. 9A is an explanatory diagram showing the conventional cylindrical roller.
Figure 9B:
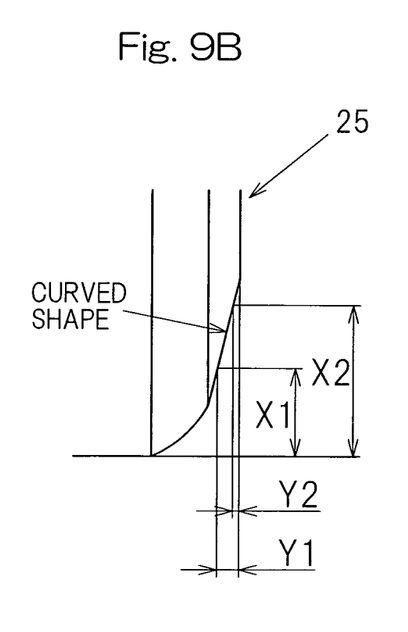
FIG. 9B is an explanatory diagram showing the conventional cylindrical roller.

As discussed above, the prior art techniques are effective to achieve an ideal contact between the collar face and the cylindrical rollers, but the sectional shape of the end face of each of the cylindrical rollers is necessarily shaped to represent a curved shape and, therefore, the number of process steps tends to increase in respect of the control of the curved shape. In other words, in order to control the curved shape, a commercially available shape measuring instrument is used, but instead thereof, as shown in FIG. 9B, illustrating on an enlarged scale a portion B of the cylindrical roller 25 shown in FIG. 9A, measurement at a plurality of locations is necessitated such as including, for example, measurement of amounts of drop Y1 and Y2 in an axial direction at respective positions X1 and X2 of the roller end face, which are displaced from a roller outer diametric edge position towards a roller axis side.

An object of the present invention is to provide a cylindrical roller bearing assembly capable of increasing the load bearing capability with respect to the thrust load and of easily controlling the shape of the cylindrical roller.

The cylindrical roller bearing assembly of the present invention is a cylindrical roller bearing assembly including an inner ring, an outer ring and a plurality of cylindrical rollers interposed between respective raceways of the inner and outer rings, one or both of the inner and outer rings having a collar portion on one or both axial sides thereof, in which a surface portion encompassed within the region of radial dimensions of 0.12Da to 0.20Da as measured from an outer diametric edge of an end face of each of the cylindrical rollers to a roller axis, where Da represents an outer diameter of each of the cylindrical roller, is rendered to be a crowned portion of a tapered shape inclined at an angle of 0.25° to 1° relative to a plane perpendicular to the roller axis.

According to the above construction, since the crowned portion of the tapered shape of the above prescribed angle is provided in the surface portion in the cylindrical roller end face, the load bearing capability with respect to the thrust load can be increased. Also, since the crowned portion is of the tapered shape, the shape control of the cylindrical roller can be accomplished easily.

In one embodiment of the present invention, the inner ring may be made up of an inner ring raceway ring having a collar portion at one end portion thereof and also having an outer periphery formed with a raceway, and a collar ring arranged adjacent to the other end portion of the inner ring raceway ring; in which the outer ring may be of one-piece structure having collar portions at opposite ends thereof and also having an inner periphery formed with a raceway; and in which when an inclination angle of an inside face of the collar portion of the inner ring raceway ring relative to a plane perpendicular to an inner ring axis is represented by θi, an inclination angle of an inside face of the collar portion of the outer ring relative to a plane perpendicular to an outer ring axis is represented by θo, an inclination angle of an inside face of the collar portion of the collar ring protruding from the raceway towards an outer diametric side, relative to a plane perpendicular to a collar ring axis is represented by θ1, and the inclination angle of the tapered crowned portion of each of the cylindrical rollers is represented by θr, those angles may be so chosen as to satisfy the following equations:

$$(\theta i + \theta o) - 2 \cdot \theta r = -1.25° \text{ to } 0.25° \text{ and}$$

$$(\theta 1 + \theta o) - 2 \cdot \theta r = -1.25° \text{ to } 0.25°$$

In the case of this construction, even if there is a difference between those inclination angles, a sufficient effect necessary to increase the load bearing capability relative to the thrust load can be increased.

In one embodiment of the present invention, a runout of the tapered crowned portion at the end face of each of the cylindrical rollers may be chosen to be equal to or smaller than 0.003 mm. In the case of this construction, it is effective to suppress a load bearing capability hampering of the thrust load resulting from the dimensional error in the tapered crowned portion.

In one embodiment of the present invention, an end face runout of a flat portion of the end face of each of the cylindrical rollers excluding the tapered crowned portion may be chosen- to be equal to or smaller than 0.002 mm. In the case of this construction, effects to secure the runout precision of the tapered crowned portion during the processing and to eliminate a cause of loss of a smooth contact state during the rotation can be appreciated. It is to be noted that the runout of the tapered crowned portion is measured according to the same knack as the method of measuring the end face runout according to JIS B 1506: 2005.

In one embodiment of the present invention, an outer diametric surface of the cylindrical roller may be rendered to be a crowned portion.

Since in this cylindrical roller bearing assembly of the present invention, the temperature rise during the driving can be suppressed as a result of use of the tapered crowned portion at the end face of each of the cylindrical rollers, the bearing dimension can be reduced even in the field of application where the bearing dimension must be large in the case of the conventional product having a low load bearing capability against the thrust load. However, when the bearing dimension is reduced to such an extent as to enable the load bearing capability against the thrust load to be secured, the load bearing capability against the radial load must also be taken into consideration. In view of this, the crowned portion is provided even in the outer diametric surface of each of the cylindrical rollers and, accordingly, the load bearing capability against the radial load cal also be secured.

In one embodiment of the present invention, the tapered crowned portion of the end face of each of the cylindrical rollers may be made of multi-staged tapered face portions continued to an outer diametric side, the inclination angle of each of the tapered face portions being so chosen to be large as it is closest to the outer diametric side.

By forming the tapered crowned portion in the form of the multi-staged tapered face portions, suppression of the local edge stress appearing at the boundary between the tapered crowned portion and the chamfered portion continued thereto can be enhanced.

In one embodiment of the present invention, the inclination angle of the tapered face of the tapered crowned portion, which is closest to an inner diametric side, may be θr that satisfies each of the equations referred to above.

In the present invention, the difference between the respective inclination angles of the neighboring tapered face portions of the tapered crowned portion may be chosen to be 1° or smaller.

Since where the tapered crowned portion is formed by the multi-staged tapered face portions, there is a risk that the edge stress may occur at the boundary between the neighboring tapered face portions, the difference between the respective inclination angles of the neighboring tapered face portions is preferably so chosen as to be equal to or smaller than about 1°.

In one embodiment of the present invention, a runout of the tapered face portion of the tapered crowned portion, which is closest to an inner diametric side, may be chosen to be equal to or smaller than 0.003 mm.

BRIEF DESCRIPTION OF THE DRAWINGS

In any event, the present invention will become more clearly understood from the following description of embodiments thereof, when taken in conjunction with the accompanying drawings. However, the embodiments and the drawings are given only for the purpose of illustration and explanation, and are not to be taken as limiting the scope of the present invention in any way whatsoever, which scope is to be determined by the appended claims. In the accompanying drawings, like reference numerals are used to denote like parts throughout the several views, and:

DETAILED DESCRIPTION OF THE EMBODIMENTS

An embodiment of the present invention will be described in detail with particular reference to FIG. 1 to FIGS. 8A to 8C. The cylindrical roller bearing assembly shown therein includes an inner ring 1 having opposite end portions thereof formed with collar portions 7a and 8a and also having an outer periphery formed with a raceway 3, an outer ring 2 having opposite ends thereof formed with collar portions 9a and 9a and also having an inner periphery formed with a raceway 4, a plurality of cylindrical rollers 5 interposed rollingly between the raceway 3 of the inner ring 1 and the raceway 4 of the outer ring 2, and a retainer 6 for guiding the cylindrical rollers 5 to circumferentially equidistantly displaced positions.

Figure 1:
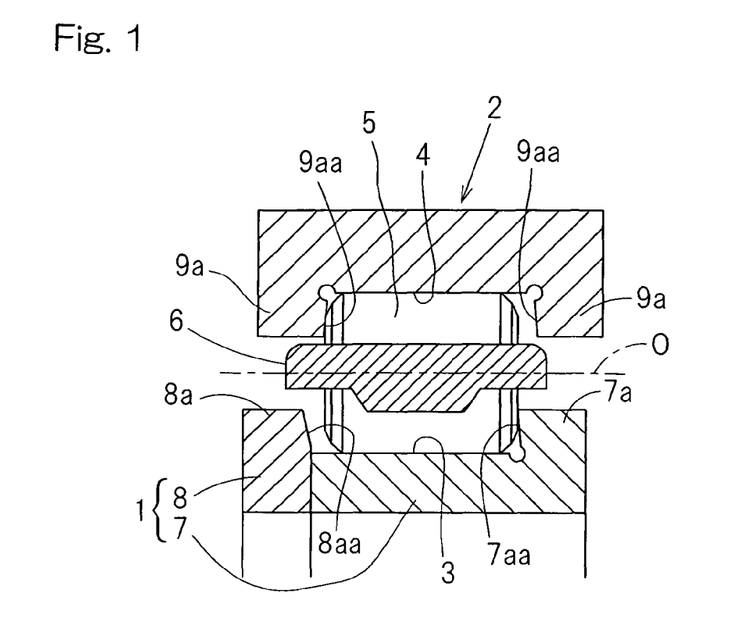
FIG. 1 is a sectional view showing a cylindrical roller bearing assembly according to an embodiment of the present invention.

The inner ring 1 is made up of an inner ring raceway ring 7 having the collar portion 7a at one end portion thereof and also having the outer periphery formed with the raceway 3, and a collar ring 8 arranged adjacent to the other end portion of the inner ring raceway ring 7. In the collar portion 7a of the inner ring raceway ring 7, an inside surface 7aa confronting one end face of each of the cylindrical rollers 5 is formed as a collar face for guiding the respective cylindrical roller in an axial direction. In the collar portion 8a protruding on an outer diametric side beyond the raceway 3 of in the inner ring raceway ring 7 of the collar ring 8, an inside surface 8aa confronting the other end face of the respective cylindrical roller 5 is formed as a collar face for guiding the respective cylindrical roller in the axial direction.

The outer ring 2 is of one-piece structure having its opposite end portions provided with the respective collar portions 9a and 9a and also having the inner periphery formed with the raceway 4. In each of the collar portions 9a of the outer ring 2, the associated inside surface 9aa confronting the end face of each of the cylindrical rollers 5 is formed as a collar face for guiding the respective cylindrical roller in the axial direction.

Figure 2A:
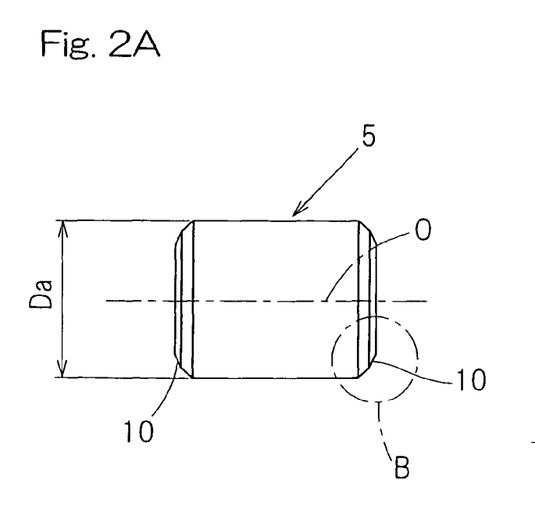
FIG. 2A is a front elevational view of the cylindrical roller employed in the cylindrical roller bearing assembly.
Figure 2B:
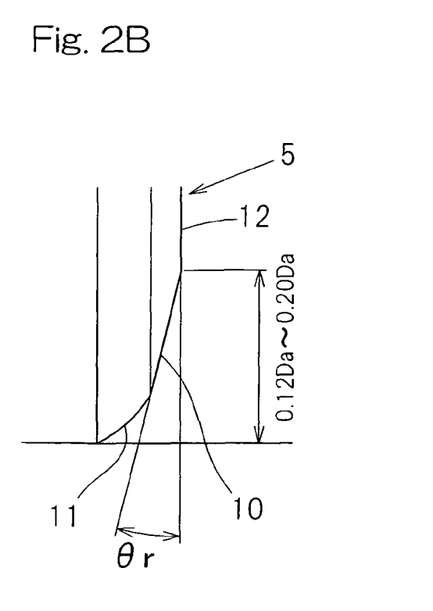
FIG. 2B is an enlarged view of a portion of the cylindrical roller indicated by B in FIG. 2A.

As best shown in FIG. 2B on an enlarged scale, where the outer diameter of each of the cylindrical rollers 5 is represented by Da, a surface portion encompassed within the range of the radial dimension 0.12Da to 0.20Da (preferably 0.15±0.02Da) extending from an outer diametric edge of one end face of each of the cylindrical rollers 5 to a roller axis O is formed with a crowned portion 10 of a tapered shape having an inclination angle θr within the range of 0.25° to 1° (preferably 0.25° to 0.75°) relative to a plane perpendicular to the roller axis O. The crowned portion 10 continues to a chamfered portion 11 on an outer diametric side thereof and then to an outer diametric surface by way of this chamfered portion 11. It is to be noted that the chamfered portion 11 may be of either a tapered shape or an arcuate sectional shape.

Figure 3A:
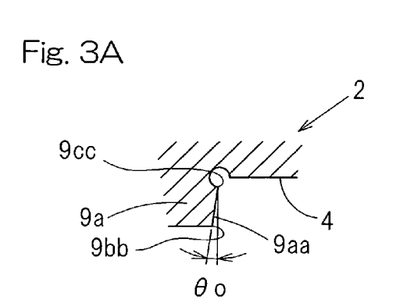
FIG. 3A is an enlarged sectional view of an outer ring collar portion in the cylindrical roller bearing assembly.
Figure 3B:
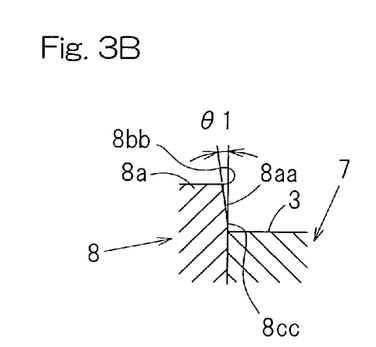
FIG. 3B is an enlarged view of the collar ring collar portion.
Figure 3C:
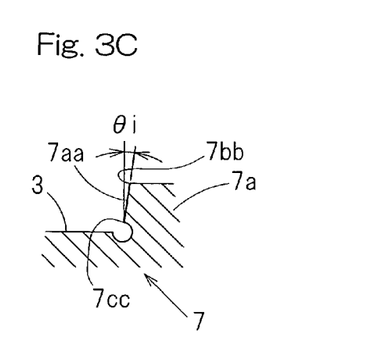
FIG. 3C is an enlarged sectional view of an inner ring collar portion.

The inside surface 9aa of the collar portion 9a of the outer ring 2, which defines the collar face, is, as best shown in FIG. 3A on an enlarged scale, rendered to be of a tapered shape having a slight inclination angle θo relative to a plane perpendicular to an outer ring axis. As shown in FIG. 3B on an enlarged scale, the inside surface 8aa of the collar portion 8a of the collar ring 8, which defines the collar face, is also rendered to be of a tapered shape having a slight inclination angle θ1 relative to a plane perpendicular to a collar ring axis. In addition, the inside surface 7aa of the collar portion 7a of the inner ring raceway ring 7, which defines the collar face, is, as best shown in FIG. 3C on an enlarged scale, rendered to be of a tapered shape having a slight inclination angle θi relative to a plane perpendicular to an inner ring axis. In this case, those inclination angles θo, θ1 and θi are so chosen as to be within the range of 0.15° to 0.85° (preferably 0.25° to 0.6°).

The height of protrusion of each of the collar portions 7a, 8a and 9a, protruding radially from the associated raceways 3 and 4, is so chosen to be within the range of 0.16Da to 0.25Da, in which Da represents an outer diameter of each of the cylindrical rollers 5.

Also, in the illustrated embodiment, the runout, that is, the tolerance of the tapered crowned portion 10 in the end face of each of the cylindrical rollers 5 is set to be equal to or smaller than 0.003 mm. In addition, the runout, that is, the tolerance of a flat portion 12 excluding the tapered crowned portion 10 in the end face of each of the cylindrical rollers 5 is set to be equal to or smaller than 0.002 mm.

Figure 4:
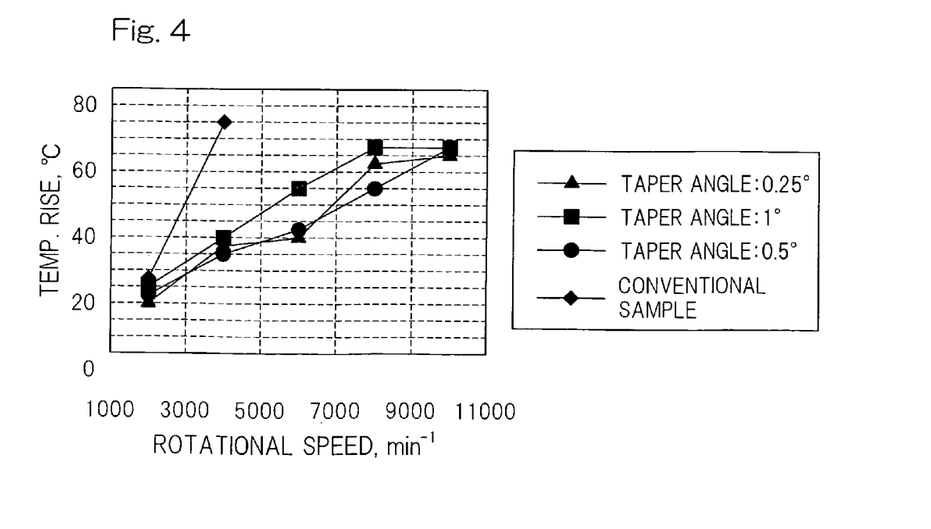
FIG. 4 is a chart showing results of experiments, showing a temperature rise reducing effect exhibited by the cylindrical roller bearing assembly as compared with that of the conventional sample.

FIG. 4 illustrates a chart showing results of temperature rise test, which were obtained by preparing a plurality of samples, as cylindrical roller bearing assemblies according to this embodiment, in which the shape dimension and the inclination angles fall within the respective ranges of the values discussed above, and then comparing them with the conventional sample. During the test, bearing temperature rise values for each of various rotational speeds were recorded under the following test conditions.

Size of Bearing assembly: 35 mm in inner diameter, 80 mm in outer diameter and 21 mm in width.
Radial load: 5 KN
Thrust Load: 2 KN
Lubricant: Turbine oil
Rotational Speed (Inner ring rotation): 2000 to 10000 min$^{-1}$ From those test results, it is ascertained that in the cylindrical roller bearing assembly according to the embodiment now under discussion, in which the tapered crowned portion 10 is provided in the end face of each of the cylindrical rollers 5, the temperature rise is suppressed as compared with that exhibited by the conventional sample. In other words, according to the cylindrical roller bearing assembly according to the embodiment now under discussion, the load bearing capability against the thrust load can be increased.

Although to process the end face of each of the cylindrical rollers 5 to a crowing of the end face to represent an ideal curved shape is considered theoretically effective, the foregoing test results have made it clear that in the actual cylindrical roller bearing assembly, the load bearing capability against the thrust load can be sufficiently increased even when the tapered crowned portion 10 is substituted as is the case in the illustrated embodiment. The foregoing test results have also made it clear that even though the inclination angle θr of the tapered crowned portion 10 may have some variation, no large difference in performance arises provided that the variation is within a given limit.

Even when the tapered crowned portion 10 is provided in the end face of each of the cylindrical rollers 5 such as in the embodiment now under discussion, pinpoint processing with respect to the exact dimensions aimed at in the actual processing is very difficult to achieve when the productivity is taken into consideration. In view of this, in the foregoing test, the inclination angle θr of the tapered crowned portion 10 has been set to an arbitrarily chosen value so that difference in effect could be ascertained.

In order to equalize the contact surface pressure between the end face of each of the cylindrical rollers 5 and each of the collar portions 7a, 8a and 9a, if neither skew nor tilt is taken into consideration, it is desirable that the respective inclination angles θi, θ1 and θo of the inside surfaces 7aa, 8aa and 9aa should be made equal to the inclination angle θr of the tapered crowned portion 10. In the above discussed test, the use has been made of the samples having different inclination angles, in which the inclination angle θo at the outer ring collar portion 9a was about equal to 0.25°, the inclination angle θi at the inner ring collar portion 7a was about 0.5° and the inclination angle θr of the tapered crowned portion 10 was within the range of 0.25° to 1° and influences on the effect in such case were also examined. According to the results of the test, it has been ascertained that even in this case the temperature rise is reduced as compared with the conventional sample.

During the test referred to above, the manner of contact between each of the collars 7a, 8a and 9a and the end face of each of the cylindrical rollers 5 was examined and, as a result, markings indicative of the contact could have been occurred at a location where the contact was not expected in view of the inclination angle θr of the tapered crowned portion 10 and the inclination angle θi, θ1 and θo of the collar face of each of the collar portions 7a, 8a and 9a. This appears to have suggested that even when the inclination angle θr of the tapered crowned portion 10, the inclination angle θo of the collar face of the outer ring collar portion 9a and the inclination angle θi of the collar face of the inner ring collar portion 7a are somewhat different, the respective cylindrical roller could rotate with a loaded load in a posture somewhat changed.

The manner of how each of the cylindrical rollers 5 employed in the cylindrical roller bearing assembly rotate appears to be affected by the rotational speed, the load or the viscosity of the lubricant, type and material of the retainer 6 used and, accordingly, it is difficult to determine accurately. However, so long as the cylindrical roller bearing assembly is of the type according to the embodiment, in which the numerical values are limited to those described above, the load bearing capability against the thrust load can be increased as compared with the conventional sample. In such case, provided that the range is employed, in which the inclination angle θi of the collar face of the inner ring collar portion 7a, the inclination angle θo of the collar face of the outer ring collar portion 9a and the inclination angle θr of the tapered crowned portion 10 are within the respective ranges that satisfy the following equation, a sufficient effect can be secured despite the presence of a difference among those inclination angles referred to hereinabove:

$$(\theta i+\theta o)-2\cdot\theta r=-1.25°\sim0.25° \quad (1)$$

It is to be noted that if the value of the left term of the above equation (1) is smaller than −1.25°, contact between each cylindrical roller and 7bb, 8bb and 9bb of the inside surfaces 7aa, 8aa and 9aa of the respective collar portions, which are located at a position remotest from the raceway, becomes considerable and there is the possibility that the surface pressure at those portions is so excessive as to result in seizure.

On the other hand, if it exceeds 0.25, contact between each cylindrical roller and portions 7bb, 8bb and 9bb of the inner side surfaces 7aa, 8aa and 9aa of the respective collar portions, which are located at a position remotest from the raceway, becomes considerable and there is the possibility that the surface contact pressure at those portions is so excessive as to result in seizure.

Also, if the inclination angle θ1 of the collar face of the collar ring collar portion 8a, the inclination angle θo of the collar face of the outer ring collar portion 9a and the inclination angle θr of the tapered crowned portion 10 are within the respective ranges that satisfy the following equation, a sufficient effect can be secured despite the presence of a difference among those inclination angles referred to hereinabove:

$$(\theta 1+\theta o)-2\cdot\theta r=-1.25°\sim0.25° \quad (1)$$

Figure 5:
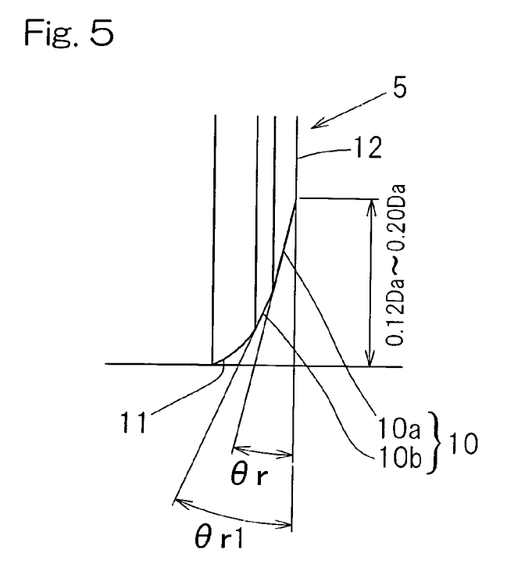
FIG. 5 is an enlarged view showing an example of a tapered crowned portion in a cylindrical end face in the cylindrical roller bearing assembly.

Although in the foregoing explanation, the tapered crowned portion 10 at the end face of each cylindrical roller 5 has been shown and described as having such a shape as shown in FIG. 2B, it may be designed to represent a tapered crowing processed portion 10 made up of two staged tapered face portions 10a and 10b continued to the outer diametric side as best shown in FIG. 5. In such case, the inclination angle θr1 of the tapered face portion 10b that is closer to the outer diametric side is so chosen as to be greater than the inclination angle θr of the tapered face portion 10a that is remoter from the outer diametric side (i.e., θr1>θr).

As hereinabove described, formation of the tapered crowned portion 10 in the form as having the double staged tapered face portions 10a and 10b is effective to further increase the suppression of a localized edge stress occurring at the boundary between the tapered crowned portion 10 and the chamfered portion 11 continued to the outer diametric side thereof. It is, however, to be noted that the tapered surface portions referred to above may have a plurality of stages, for example, three or more stages, with the inclination angle of each of the multi-staged tapered surface portions being larger towards the outer diametric side.

Where the tapered crowned portion 10 is formed by the multi-staged tapered face portions, an edge stress at the boundary between the neighboring tapered face portions can occur. For this reason, difference between the inclination angles of the neighboring tapered crowned portions is preferably set within 1°. In other words, in the case of the example shown in FIG. 5, in which the tapered crowned portion 10 is formed by, for example, double staged tapered face portions 10a and 10b, the following equation establishes preferably:

$$\theta r1-\theta r\leq 1° \quad (3)$$

Also, in that case, the inclination angle of the tapered face portion 10a of the tapered crowned portion 10, which is closest to the inner diametric side, is preferably an inclination angle θr, with which both of the previously discussed equations (1) and (2) establishes.

Since in this cylindrical roller bearing assembly the temperature rise which takes place at the time of driving can be suppressed as a result of the provision of the tapered crowned portion 10 in the end face of each of the cylindrical rollers 5, the bearing dimension can be reduced even in the application where the bearing dimension must be large particularly in the case of the conventional product of a type, which exhibits a small load bearing capability against the thrust load. However, when the bearing dimension is reduced to such an extent that the loading capability against the thrust load can be secured, consideration is required to the load bearing capability against the radial load. In view of this, in order to secure the load bearing capability against the radial load, in the cylindrical roller bearing assembly according to the above described embodiment of the present invention, it is desirable that opposite end portions of an outer diametric surface of each of the cylindrical rollers 5 be provided simultaneously with, for example, a crowned portion of a simple arcuate shape in its sectional shape or a crowned portion of a logarithmically curved shape (See the JP Laid-open Patent Publication No. 2005-155763.).

It is to be noted that although it differs from the cylindrical roller bearing assembly according to the above described embodiment, when the crowned portion is simultaneously provided in the outer diametric surface of each cylindrical roller as hereinabove described, the load bearing capability against the thrust load and the load bearing capability against the radial load can be simultaneously secured even in the cylindrical roller bearing assembly, in which the crowned portion of the curved shape in sectional shape is provided at the end faces of each cylindrical roller.

As hereinabove described, in the case of the cylindrical roller bearing assembly, the thrust load can be loaded when the collar face of each of the collar portions 7a, 8a and 9a and the end faces of each cylindrical roller contact with each other, but other than the shape being properly designed at that contact area, the dimensional error of each roller end face and the relative difference in roller length within the bearing assembly are regarded as important elements.

By examining the samples used during the test discussed previously, it has been confirmed that markings descriptive of contact of the collar faces of the collar portions 9a of the outer ring 2, which was a stationary ring, were not uniform over the circumference, but were prominent approximately on respective sides of an area that were loaded with the radial load. From this finding, it appears that the cylindrical rollers 5 then actually loaded with the thrust load are the cylindrical rollers 5 present in a direction of the loaded area of the radial load.

Figure 6A:
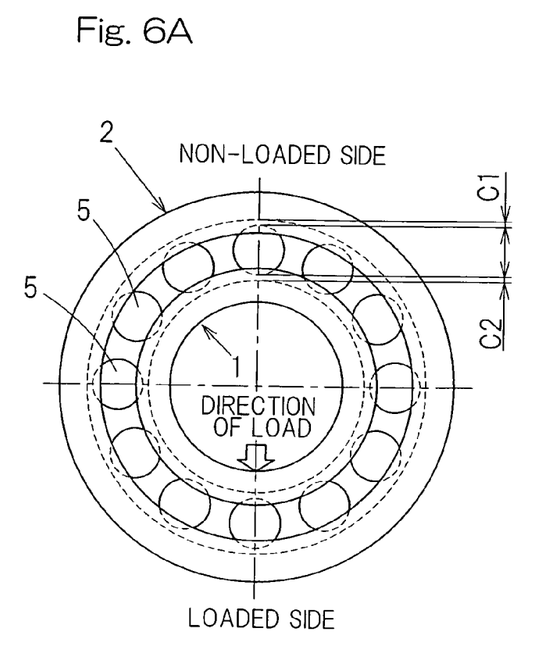
FIG. 6A is an explanatory diagram showing respective states of a non-loaded area and a loaded area in the cylindrical roller bearing assembly.
Figure 6B:
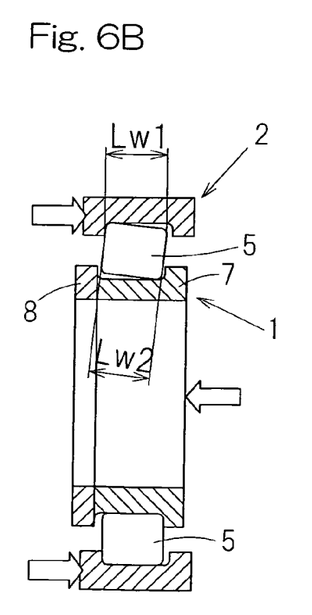
FIG. 6B is an explanatory diagram showing respective states of a non-loaded area and a loaded area in the cylindrical roller bearing assembly.
Figure 7A:
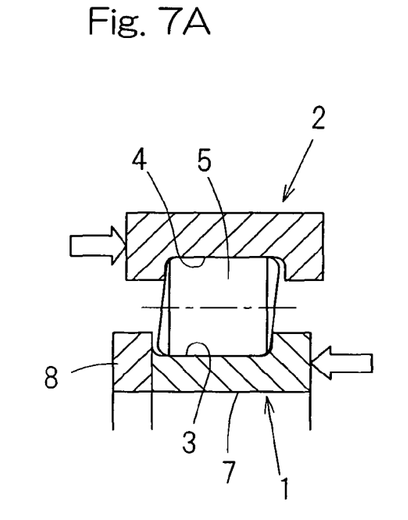
FIG. 7A is an explanatory diagram showing one example of the cylindrical roller bearing assembly when the end face dimensional error of the cylindrical roller is large.
Figure 7B:
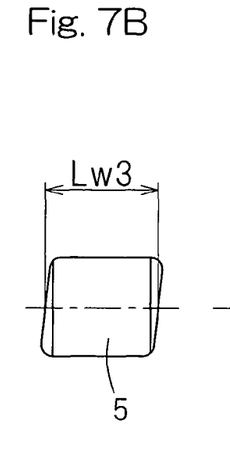
FIG. 7B is an explanatory diagram showing one example of the cylindrical roller bearing assembly when the end face dimensional error of the cylindrical roller is large.
Figure 7C:
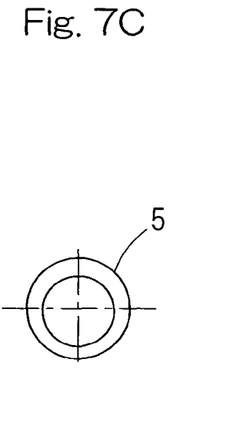
FIG. 7C is an explanatory diagram showing one example of the cylindrical roller bearing assembly when the end face dimensional error of the cylindrical roller is large.
Figure 8A:
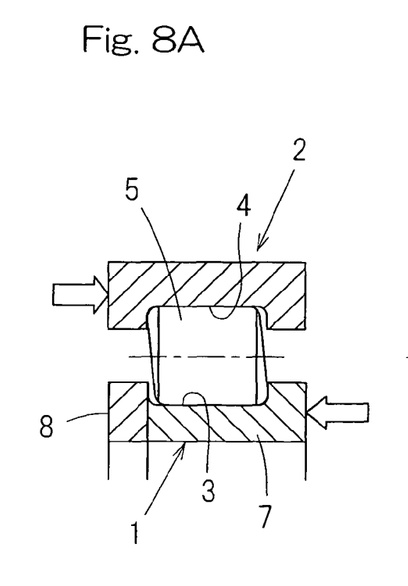
FIG. 8A is an explanatory diagram showing another example of the cylindrical roller bearing assembly when the end face dimensional error of the cylindrical roller is large.
Figure 8B:
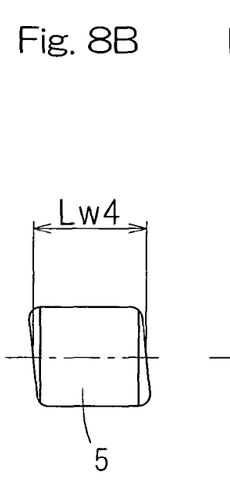
FIG. 8B is an explanatory diagram showing another example of the cylindrical roller bearing assembly when the end face dimensional error of the cylindrical roller is large.
Figure 8C:
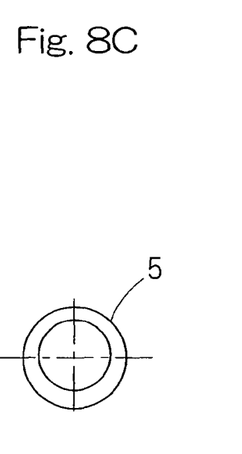
FIG. 8C is an explanatory diagram showing another example of the cylindrical roller bearing assembly when the end face dimensional error of the cylindrical roller is large.

FIGS. 6A and 6B illustrate front elevational and sectional views, respectively, showing each of the cylindrical rollers 5 being loaded with the thrust load and a condition of each of the cylindrical rollers 5 within a non-loaded region that forms a phase difference of 180° relative to the radial direction. Since such radial gaps as shown by C1 and C2 in FIG. 6A exist in the non-loaded region, the respective cylindrical roller 5 can therefore tilt. In such case, the axial length between contact portions of the opposite end faces of the respective cylindrical roller 5 becomes smaller than the axial distance between the collar face of the outer ring collar portion 9a and the collar face of the inner ring collar portion 7a and, therefore, the thrust load is no longer loaded. Accordingly, one cylindrical roller 5 traverses the loaded region and the non-loaded region repeatedly as a result of rotation.

As a result, in the cylindrical roller bearing assembly, when the axial length of one of the cylindrical rollers 5 is greater than the other cylindrical rollers, it may occur that the load of the thrust load in the loaded region will be concentrated on such one of the cylindrical rollers 5. Also, when the cylindrical roller 5 of a greater axial length abruptly enters from the non-loaded region into the loaded region, it may occur that the inner ring raceway ring 7 and the outer ring 2 may be expanded abruptly in the axial direction and/or that the posture of some of the cylindrical rollers 5 will become unstable to cause vibration, as a result of a reaction thereof.

In view of the foregoing aspects, it is desirable that the relative difference between the axial lengths between the cylindrical rollers 5 within one cylindrical roller bearing assembly should be chosen so as to fall within a proper range. The necessity of the relative difference in axial length of the cylindrical rollers to be carefully considered is addressed also in the Patent Document (JP Laid-open Patent Publication No. 2002-89548).

In the foregoing description, reference has been made to the necessity of thoughtful consideration on the relative difference in axial length of the cylindrical rollers, and besides, the matter on the accuracy of each of the cylindrical rollers includes a roller end face runout as defined in JIS B 1506. According to JIS B 1506, this end face runout is defined as a deviation of the end face relative to a radial plane in a roller end face portion. In the event that this runout accuracy is regarded as resulting from a runout accuracy in the tapered crowned portion 10 in the cylindrical roller bearing assembly referred to in the embodiment now under discussion, similar events to those occurring when the relative difference in axial length of the cylindrical rollers is large will occur if the runout is large.

By way of example, where each of the cylindrical rollers 5 employed in the cylindrical roller bearing assembly according to the embodiment is so processed as to assume a shape, in which a large dimensional error occurs in the roller end face as shown in FIGS. 7A to 7C and FIGS. 8A to 8C, it will happen that in one cylindrical roller 5, the axial length of a portion bound between the inner ring collar portion 7a and the outer ring collar portion 9a will vary depending on the position on the circumference. When such a cylindrical roller 5 enters from the non-loaded region into the loaded region with a portion of the longest axial length entering the first thing, a situation similar to that occurring when the cylindrical roller 5 of a great axial length enters will occur. Also, when such a cylindrical roller 5 rotate within the loaded region, the axial length will vary among the opposite end face contact portions of one cylindrical roller 5 and, therefore, a cause will be constituted of generation of an excessive load and/or vibration due to a load concentration.

It is quite often that some cylindrical roller bearing assemblies, which are not finely designed products, generally make use of cylindrical rollers of a grade 2 to 5 rating (JIS B 1506) and, in such case, the tolerance is within the range of 0.006 to 0.015 mm.

Accordingly, in the cylindrical roller 5 shown in FIGS. 7A to 7C and FIGS. 8A to 8C, the amount of change of the axial direction of that portion bound by the collar portions corresponds to the amount of runout in the case of the worst shape, which will be extremely large. In order to suppress hampering a load bearing capability of the thrust load resulting from this cause, in the case of the cylindrical roller bearing assembly according to the embodiment now under discussion, it is preferred that runout of the tapered crowned portion 10 at the end face of each of the cylindrical rollers 5 employed therein be equal to or smaller than 0.003 mm. Particularly in the case of the use in the field of application that requires low vibration and low noise such as an electric motor, it is preferred that the runout referred to above be suppressed to a value equal to or smaller than 0.002 mm. Whereas shown in FIG. 5, the tapered crowned portion 10 made up of the multi-staged tapered face portions 10a and 10b is formed, the runout of the tapered face portion 10a, which is closest to the inner diametric side, may be chosen to be of a value equal to or smaller than 0.003 mm.

Although in the foregoing description, reference has been made to the runout of the tapered crowned portion 10 at the end face of each of the cylindrical rollers 5, even in the flat portion 12 (shown in, for example, FIG. 2B) of the end face of the respective cylindrical roller 5 excluding the tapered crowned portion 10 the end face runout is preferably small. In processing the cylindrical rollers 5, even when either the tapered crowned portion 10 or the flat portion 12 is processed the first thing, if the end face runout of the both is large, the boundary between the tapered crowned portion 10 and the flat portion 12 undergoes meandering or depicts an elliptical shape on the circumference. When such a processing is carried out, in the first place the radial widthwise dimension of the tapered crowned portion 10 will hardly become difficult to secure. In the second place, if the inclination angle θr of the tapered crowned portion 10 at the end face of the cylindrical roller 5 is large relative to the inclination angles θi, θ1 and θo of the collar faces, a portion of the end face of the cylindrical roller 5, which contacts the collar face, forms a boundary portion between the tapered crowned portion 10 and the flat portion 12 and, therefore, a smooth contact condition during the rotation will be impaired. In order to avoid the possible occurrence of such condition, in the cylindrical roller bearing assembly according to the embodiment the end face runout of the flat portion 12 at the end face of each of the cylindrical rollers 5 employed therein is preferably chosen to be of a value equal to or smaller than 0.003 mm (more preferably equal to or smaller than 0.002 mm).

In the foregoing embodiment, the cylindrical roller bearing assembly has been shown and described as including the inner ring raceway ring 7, the outer ring 2, the collar ring 8, the cylindrical rollers 5 and the retainer 6. However, considering that in the present invention, the load bearing performance with respect to the thrust load is increased by properly appropriating the manner of contact between the collar face and the end face of the cylindrical roller 5 with the tapered crowned portion 10 and the runout of the roller end face, an effect of reducing the contact resistance can be expected even when the cylindrical roller may run slanting on one side in one of axial directions.

The bearing type to which the present invention can be applicable includes a single row cylindrical roller bearing assembly such as, for example, an NU type having no collar portion in the inner ring, a type having the inner ring provided with the collar at only one end thereof and having the outer ring provided with the collars at its opposite ends (NJ type), a type having one collar on the inner ring with the collar ring incorporated and having the outer ring provided with the collars at its opposite ends (NUP type), a type having the inner ring provided with the collars at its opposite ends and having no collar in the outer ring (N type), a type having the inner ring provided with the collars at its opposite ends and having the outer ring provided with the collar at only one end thereof (NF type), a type having the inner ring provided with the collars at its opposite ends and having the outer ring provided with the collar at only one end thereof with the collar ring incorporated (NP type), and a cylindrical roller bearing assembly in which the number of rows of the cylindrical rollers is plural. The present invention is also applicable to the cylindrical roller bearing assembly of a full roller type having no retainer used.

As a method of processing the tapered crowned portion 10 in the end face of the cylindrical roller 5, a method can be enumerated, in which, for example, a grindstone is brought into contact for processing. The grindstone used in this case is employed in the form as having a shape tailored by means of a dressing process to represent a replica of the tapered crowned shape. The dressing of the grindstone is to shape simply linearly, not in a complicated shape, and an error is extremely small. For this reason, there is no possibility that the matrix shape of the tapered crowned portion 10 being processed does not change considerably. By the use of such a processing method, in the angle control of the tapered crowned portion 10, it is sufficient merely to control the amount of drop from the flat portion 12 in that portion, with a point of measurement being taken at a position at which it enters the tapered crowned portion 10 a slight distance from the chamfered portion 11 from the outer diametric side of the end face of the cylindrical roller 5. With this control method, the dimension control can be easily accomplished along with the processing when a dial gauge and a simplified roller positioning device are prepared therefor.

It is to be noted that in the foregoing processing, a tumbler processing may be applied as a final processing in order to suppress the initial frictional wear, to thereby reduce the roughness. With the tumbler processing being applied, an effect of removing the edge portion being formed at the boundary in the end face of the cylindrical roller 5 between the tapered crowned portion 10 and the flat portion 12 can be expected.

Although the present invention has been fully described in connection with the embodiments thereof with reference to the accompanying drawings which are used only for the purpose of illustration, those skilled in the art will readily conceive numerous changes and modifications within the framework of obviousness upon the reading of the specification herein presented of the present invention. Accordingly, such changes and modifications are, unless they depart from the scope of the present invention as delivered from the claims annexed hereto, to be construed as included therein.

(REFERENCE NUMERALS)
1: Inner ring
2: Outer ring
3, 4: Raceway
5: Cylindrical roller
7: Inner ring raceway ring
7a: Collar portion
7aa: Inside face (collar face) of an inner ring collar portion
8: Collar ring
8a: Collar portion
8aa: Inside face (collar face) of a collar ring collar portion
9: Outer ring
9a: Collar portion
9aa: Inside face (collar face) of an outer ring collar portion
10: Tapered crowned portion
10a, 10b: Tapered face portion
12: Flat portion

What is claimed is:

1. A cylindrical roller bearing assembly comprising:
   an inner ring;
   an outer ring; and
   a plurality of cylindrical rollers interposed between respective raceways of the inner and outer rings, one or both of the inner and outer rings having a collar portion on one or both axial sides thereof,
   wherein a surface portion encompassed within the region of radial dimensions of 0.12 Da to 0.20 Da as measured from an outer diametric edge of an end face of each of the cylindrical rollers to a roller axis, where Da represents an outer diameter of each of the cylindrical roller, is rendered to be a crowned portion of a tapered shape inclined at an angle within the range of 0.25° to 1° relative to a plane perpendicular to the roller axis.

2. The cylindrical roller bearing assembly as claimed in claim 1, wherein the inner ring is made up of an inner ring raceway ring having a collar portion at one end portion thereof and also having an outer periphery formed with a raceway, and a collar ring arranged adjacent to the other end portion of the inner ring raceway ring; in which the outer ring is of one-piece structure having collar portions at opposite ends thereof and also having an inner periphery formed with a raceway; and
   wherein where an inclination angle of an inside face of the collar portion of the inner ring raceway ring relative to a plane perpendicular to an inner ring axis is represented by $\theta i$, the inclination angle of an inside face of the collar portion of the outer ring relative to a plane perpendicular to an outer ring axis is represented by $\theta o$, an inclination angle of an inside face of the collar portion of the collar ring, protruding from the raceway towards an outer diametric side, relative to a plane perpendicular to a collar ring axis is represented by $\theta 1$, and the inclination angle of the tapered crowned portion of each of the cylindrical rollers is represented by $\theta r$, those angles are so chosen as to satisfy the following equations:

$$(\theta i + \theta o) - 2 \cdot \theta r = -1.25° \text{ to } 0.25° \text{ and}$$

$$(\theta 1 + \theta o) - 2 \cdot \theta r = -1.25° \text{ to } 0.25°.$$

3. The cylindrical roller bearing assembly as claimed in claim 2, wherein a runout of the tapered crowned portion at the end face of each of the cylindrical rollers is chosen to be equal to or smaller than 0.003 mm.

4. The cylindrical roller bearing assembly as claimed in claim 3, wherein an end face runout of a flat portion of the end face of each of the cylindrical rollers excluding the tapered crowned portion is chosen to be equal to or smaller than 0.002 mm.

5. The cylindrical roller bearing assembly as claimed in claim 1, wherein an outer diametric surface of each of the cylindrical rollers is rendered to be a crowned portion.

6. The cylindrical roller bearing assembly as claimed in claim 1, wherein the tapered crowned portion of the end face of each of the cylindrical rollers is made of multi-staged tapered face portions continued to a chamfered portion that is continued to an outer diametric side, the inclination angle of each of the tapered face portions being so chosen to be larger as it is closer to the outer diametric side.

7. The cylindrical roller bearing assembly as claimed in claim 6, wherein the inclination angle of the tapered face of the tapered crowned portion that is closest to an inner diametric side is θr that satisfies the following equations:

$(\theta i + fo) - 2 \cdot \theta r = -1.25°$ to $0.25°$ and $(\theta 1 + \theta o) - 2 \cdot \theta r = -1.25°$ to $0.25°$.

8. The cylindrical roller bearing assembly as claimed in claim 6, wherein the difference between the respective inclination angles of the neighboring tapered face portions of the tapered crowned portion is chosen to be 1° or smaller.

9. The cylindrical roller bearing assembly as claimed in claim 6, wherein a runout of the tapered face portion of the tapered crowned portion that is closest to an inner diametric side, is chosen to be equal to or smaller than 0.003 mm.

* * * * *

UNITED STATES PATENT AND TRADEMARK OFFICE
CERTIFICATE OF CORRECTION

PATENT NO. : 8,414,194 B2  
APPLICATION NO. : 12/737222  
DATED : April 9, 2013  
INVENTOR(S) : Hideji Ito Page 1 of 1

It is certified that error appears in the above-identified patent and that said Letters Patent is hereby corrected as shown below:

In the Claims

Column 13, Line 3, In Claim 7, delete "(θ$i$+$fo$)" and insert -- (θi+θo) --, therefor.

Signed and Sealed this  
Thirteenth Day of August, 2013

Teresa Stanek Rea  
*Acting Director of the United States Patent and Trademark Office*